(12) United States Patent
Killpack et al.

(10) Patent No.: US 9,609,242 B2
(45) Date of Patent: Mar. 28, 2017

(54) AUTO-CORRECTION OF DEPTH-SENSING CAMERA DATA FOR PLANAR TARGET SURFACES

(71) Applicant: Intel Corporation, Santa Clara, CA (US)

(72) Inventors: Kip C. Killpack, Beaverton, OR (US); David R. Holman, Brampton (CA); Abhay A. Dharmadhikari, Portland, OH (US); Brandon Gavino, Beaverton, OR (US); Vinay K. Nooji, Hillsboro, OR (US); Katie R. Hauser, Hillsboro, OR (US); Lauren M. Lieu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/750,229

(22) Filed: Jun. 25, 2015

(65) Prior Publication Data

US 2016/0381309 A1    Dec. 29, 2016

(51) Int. Cl.
G06T 7/00      (2006.01)
H04N 5/357    (2011.01)
G06T 5/00      (2006.01)

(52) U.S. Cl.
CPC ............ *H04N 5/357* (2013.01); *G06T 5/006* (2013.01); *G06T 7/0051* (2013.01)

(58) Field of Classification Search
CPC .. H04N 13/00–13/0497; H04N 5/357–5/3577; G06T 2207/10032
See application file for complete search history.

(56) References Cited

U.S. PATENT DOCUMENTS

| 2007/0253618 | A1  | 11/2007 | Kim et al.   |              |
|--------------|-----|---------|--------------|--------------|
| 2011/0273595 | A1  | 11/2011 | Tsuda        |              |
| 2012/0002862 | A1* | 1/2012  | Mita         | G06K 9/00697 |
|              |     |         |              | 382/154      |
| 2012/0257018 | A1* | 10/2012 | Shigemura    | G02B 27/2214 |
|              |     |         |              | 348/46       |
| 2012/0287233 | A1* | 11/2012 | Wang         | H04N 13/0022 |
|              |     |         |              | 348/42       |

(Continued)

OTHER PUBLICATIONS

PCT written opinion and search report in corresponding PCT/US2016/035354 dated Sep. 2, 2016 (10 pages).

(Continued)

*Primary Examiner* — Sean Motsinger
(74) *Attorney, Agent, or Firm* — Trop Pruner & Hu, P.C.

(57) ABSTRACT

A depth-sensing camera may be used to locate objects on a planar surface. A planar fit calculation is used to model the surface. One problem with the best planar fit calculation is that it is not robust over time. Firstly, this is because the depth data has a non-linear curve near its extremities because of camera lens distortion. Secondly, as the depth-sensing camera warms up and its thermal activity changes, the depth data drifts and the initial plane fit is no longer valid. The position and the amount of curvature and drift may be different for cameras of the same make and model in some cases. In accordance with some embodiments, algorithms may be used to detect and correct for these types of errors to support more robust plane fitting in real time.

15 Claims, 4 Drawing Sheets

(56) References Cited

U.S. PATENT DOCUMENTS

| | | | |
|---|---|---|---|
| 2012/0314031 A1* | 12/2012 | Shotton | H04N 13/0203 |
| | | | 348/46 |
| 2013/0010079 A1* | 1/2013 | Zhang | H04N 13/0207 |
| | | | 348/47 |
| 2013/0163855 A1* | 6/2013 | Mathur | G06T 7/0075 |
| | | | 382/154 |
| 2013/0258047 A1 | 10/2013 | Morimoto et al. | |
| 2014/0225990 A1* | 8/2014 | Einecke | G06T 5/006 |
| | | | 348/47 |
| 2015/0022669 A1* | 1/2015 | Hall | G06T 7/0024 |
| | | | 348/187 |
| 2015/0049172 A1* | 2/2015 | Ramachandra | H04N 13/0239 |
| | | | 348/47 |
| 2015/0077596 A1* | 3/2015 | Ryu | G06T 5/006 |
| | | | 348/241 |
| 2016/0034040 A1* | 2/2016 | Wada | G06F 3/017 |
| | | | 348/47 |
| 2016/0189358 A1* | 6/2016 | Boufarguine | G06T 7/002 |
| | | | 348/50 |
| 2016/0267672 A1* | 9/2016 | Ciurea | G06T 7/0075 |

OTHER PUBLICATIONS

O'Regan, K., Investigation into the Use of the Microsoft Kinect and the Hough Transform for Mobile Robotics, May 2014, 149 pages.

Raposo, C., et al., "Fast and Accurate Calibration of a Kinect Sensor" in 2013 International Conference on 3D Vision, 3DV 2013, Seattle, WA, Jul. 1, 2013 (8 pages).

\* cited by examiner

AUTO-CORRECTION OF DEPTH-SENSING CAMERA DATA FOR PLANAR TARGET SURFACES

BACKGROUND

This relates to techniques for electronically specifying the location of objects on a planar surface.

Depth-sensing cameras can be used to identify the location of objects captured by the camera, because the depth data provided by the camera provides information that can be used to infer where different objects are located. Particularly in the case of objects located on a planar surface such as a table, it is valuable to know exactly where those objects are located in a variety of different operations. For example, a computer may be operated from the tabletop by simply making typing movements without any keyboard. The camera can be used to determine which finger is moved and to correlate that movement to a keystroke.

As another application, user gestures made on the tabletop may be correlated to computer commands.

Similarly objects placed on the tabletop may be located on the table using depth-sensing camera and the depth data that it produces. For example, someone playing a game could do so without having an actual board but simply move pieces on the table so they could appear on a computer screen as if they are on a game board.

In short, an ordinary depth-sensing camera can enable interactive functionality on an uninstrumented planar surface, such as a tabletop. In order to make effective use of this interactive functionality, it may be desirable to segment objects, both on and above the tabletop, to support both input sensing and interaction. An enabling step in such segmentation is a one-time calibration to compute the tabletop's planar surface. In such a calibration all the objects are removed from the tabletop and a best fit plane is calculated. This calculation identifies the table's three-dimensional position relative to the depth-sensing camera and its extent. These values enable segmentation, even when the camera is angled, as opposed to orthogonal, to the planar surface or tabletop.

BRIEF DESCRIPTION OF THE DRAWINGS

Some embodiments are described with respect to the following figures.

DETAILED DESCRIPTION

One problem with the best planar fit calculation is that it is not robust over time. Firstly, this is because the depth data has a non-linear curve near its extremities because of camera lens distortion. Secondly, as the camera warms up and its thermal activity changes, the depth data drifts and the initial plane fit is no longer valid. The position and the amount of curvature and drift may be different for cameras of the same make and model in some cases.

In accordance with some embodiments, algorithms may be used to detect and correct for these types of errors to support more robust plane fitting in real time.

One solution to thermal drift is to allow the camera to warm up for ten minutes before using it. However, for many users, this wait time would negatively impact the usability of an interactive tabletop product.

Typically, depth-sensing cameras have systematic errors due to artifacts remaining after lens distortion correction and dynamic errors in the form of drift and roll. A secondary lens distortion removal may de-warp the planar data. Additionally, dynamic drift and roll errors may be detected and corrected in real time in some embodiments.

While depth-sensing cameras may perform native lens distortion correction on the depth data, errors and biases remain after this correction. For example, a RealSense R200 camera available from Intel Corporation of Santa Clara, Calif., positioned one meter from a planar surface, has an error specification allowing for peak to trough errors of about 8 millimeters. When a plane is fit through the depth data, the measured offset from plane error can be as high as +/−5 millimeters over 50 millimeter distance along the plane. These errors may prevent tight segmentation from the plane, making applications like small object detection on a table or sensing a user's finger contact with a surface less reliable.

Figure 1:
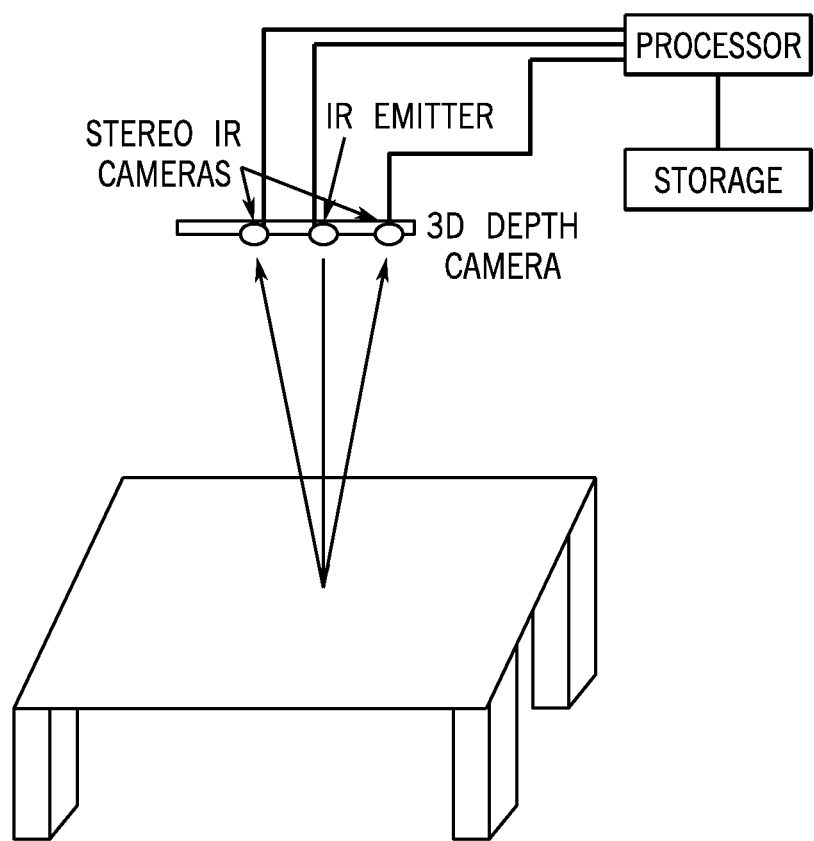
FIG. 1 is s schematic depiction of one embodiment.

Referring to FIG. 1, a stereo pair of infrared (IR) cameras may be mounted over a tabletop as depicted. An IR transmitter is situated between the two cameras. The cameras image the IR reflection off the table. The depth cameras may be coupled to a hardware processor with storage.

Objects on the table such as the user's hands may reflect IR back to the cameras that then can measure the position of the user's hands on the table. Disparity between the two cameras is used to calculate a 3D depth map of the volume below the camera in some cases.

The depth data from the cameras contain a planar surface. Due to uncorrected lens distortion though, there are systematic offsets from the planar surface.

Figure 2:
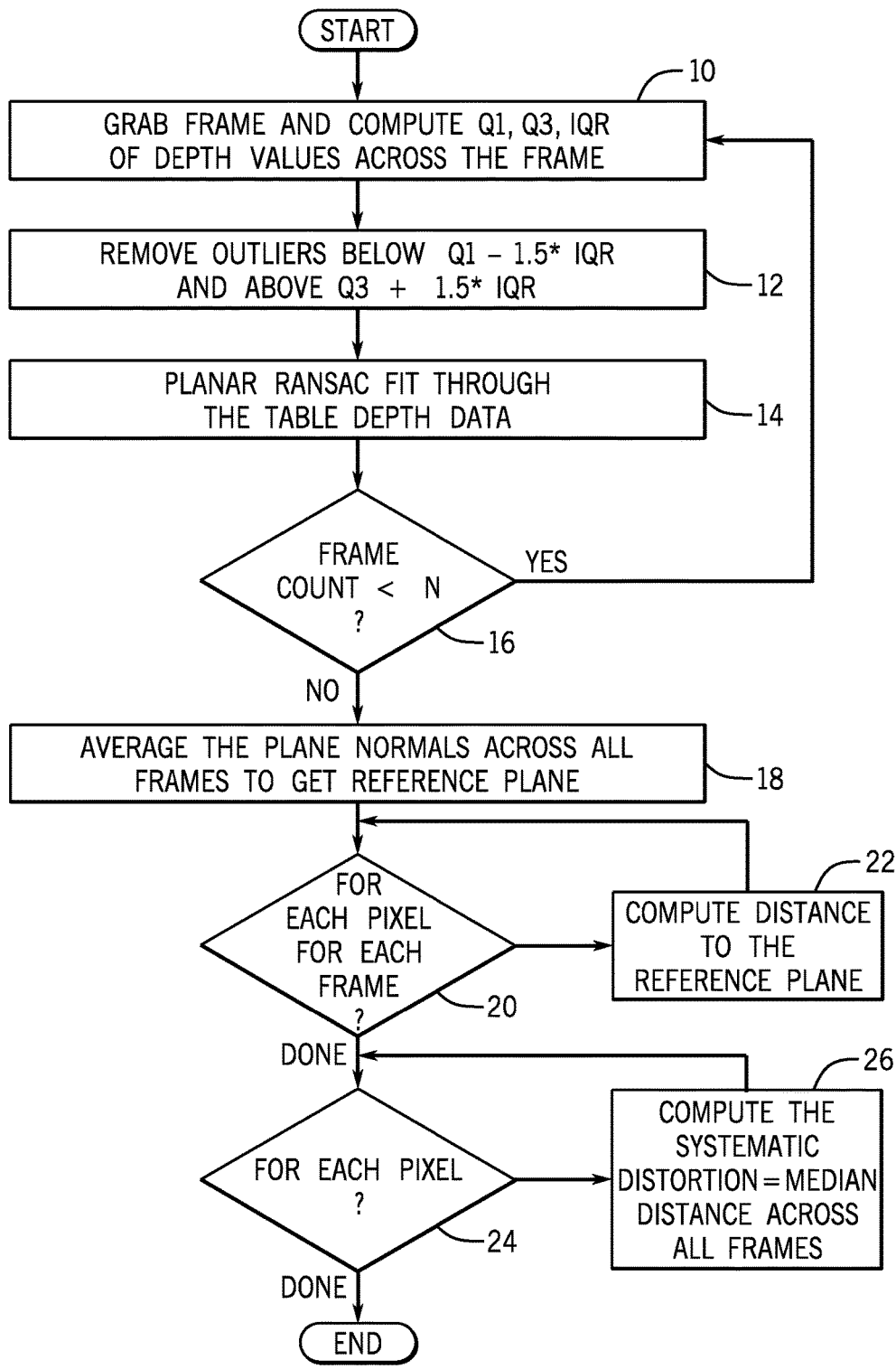
FIG. 2 is a flow chart for one embodiment.

The algorithm shown in FIG. 2 may be performed by the camera itself or by a computer with a wireless or wired connection to the camera. Automatic characterization may begin by taking multiple frame snapshots at startup and processing the data with no objects on the table. For example, in one embodiment, ten snapshots are taken of the table in order to factor out random noise in the depth data. For example, a typical pixel in the R200 camera has random errors on the order of +/−4 millimeters frame-to-frame.

Inter-quartile range (IQR) filtering may be used to remove extremely noisy outliers from the frames prior to computing an average plane fit through the table data. Inter-quartile range is a measure of the variability based on dividing data into quartiles. Quartiles divide a rank ordered data set into four equal parts. The values that divide each part are called the first, second and third quartiles, denoted Q1, Q2, and Q3. Thus the inter-quartile range is Q3-Q1.

Using the median distance to a reference frame across all frames for each pixel effectively removes noisy samples. The reference frame may be determined by averaging the plane normals across all the frames. This median distance is the systematic distortion measurement for each pixel. On live captured frames, each pixel depth value may be corrected by subtracting out the systematic distortion computed at each pixel location.

Thus referring to FIG. 2, the frames are grabbed and the Q1, Q3 and inter-quartile range of depth values across the frame are computed as indicated in block 10. Then outliers are removed as indicated in block 12. In one embodiment, outliers below Q1−1.5×IQR are removed and outliers above Q3+1.5×IQR are removed.

Then as shown in block 14, a planar random sample consensus (RANSAC) fit through the table depth data is created. RANSAC is an iterative process to estimate parameters of a mathematic model from a set of data containing outliers. A check at diamond 16 determines whether the frame count is less than N, where N is the number of frames that have been taken. If so, the flow continues to iterate back to blocks 10, 12 and 14 until all the frames have been processed.

Once all the frames are processed, then the plane normals are averaged across all the frames to get a reference frame as indicated in block 18. For each pixel for each frame, as indicated in diamond 20, the distance to the reference plane is computed as indicated in block 22. Thus the flow iterates between diamond 20 and block 22 until each pixel for each frame is processed and then the flow goes on to diamond 24. For each pixel, the systematic distortion, which is equal to the median distance across all the frames, is computed as indicated in block 26. When this is completed for each pixel, the flow ends.

On live captured frames, lens distortion is corrected for each pixel depth value by subtracting out the systematic distortion computed at each pixel location in block 26.

Figure 3:
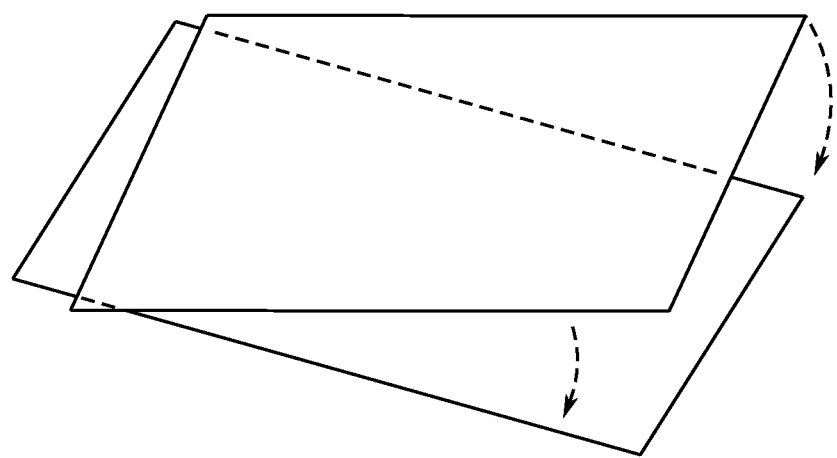
FIG. 3 shows planar drift and rotation in an illustrated embodiment.
Figure 4:
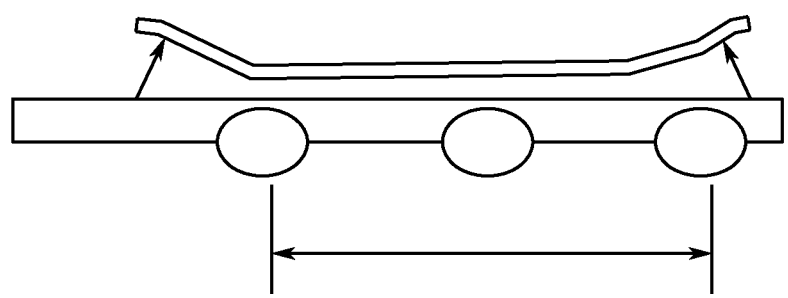
FIG. 4 is a schematic cross-section of a depth-sensing camera experiencing thermal warping caused by the camera temperature.

Even though the camera and the planar surface are stationary, the planar surface appears to drift and rotate away from the camera over time as illustrated in FIG. 3. This occurs due to thermal heating which warps the relative position of the camera's internal components and changes the location of the two stereo infrared cameras with respect to each other as shown in FIG. 4. Thus when one looks at a cross-section of the table, one expects a stable line but instead one may see the slope and intercept changing over time. Because the warping happens along the x axis of the camera, it appears that the plane of the table rotates around some arbitrary point on the y axis of the plane. Each camera may have a different rotation point, different rotation amount and stable settle time.

By first calibrating to find a horizontal reference line (the one opposite the edge closest to the user sitting at the table, for example) of the planar surface or table, one can compensate for drift and rotation. This line has some lens distortion of the raw data, so the distortion may be removed using the same distortion data computed by the algorithm of FIG. 2.

In one embodiment, the top edge is chosen because it is unlikely that any large objects or the user's hands and arms will occlude this entire line. But a different edge may be chosen in other embodiments. Again because multiple snapshots of this line are taken, one should be able to compensate for random noise. For each snapshot, a RANSAC line fit through the top edge line is performed and then all the line fits are averaged to provide the final reference line.

Figure 5:
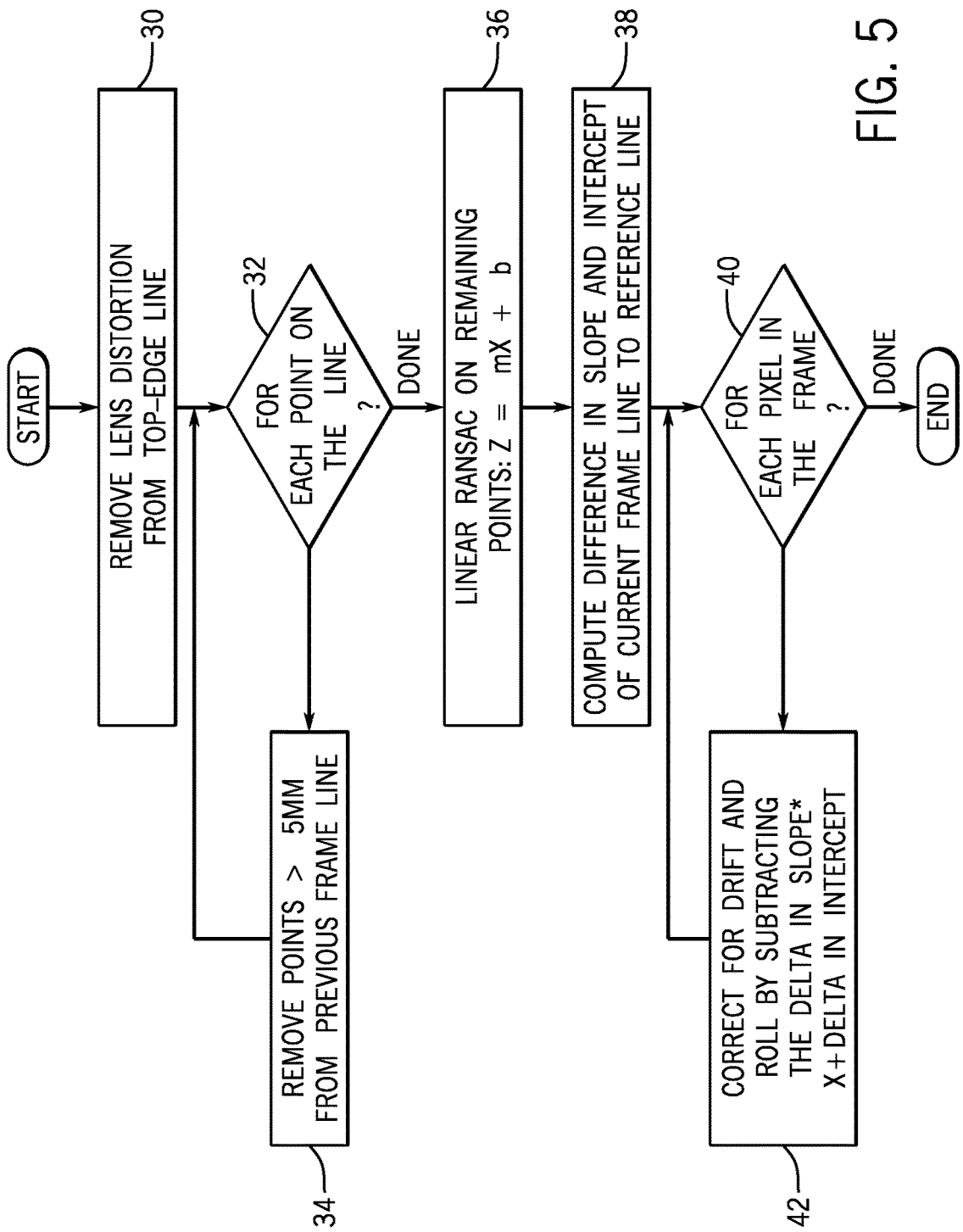
FIG. 5 is another flow chart for one embodiment.

During live screening of data, the depth data for the top edge of the frame is collected and the rolling RANSAC calculation shown in FIG. 5 is implemented. The 5 millimeter filter on the line points acts as a low pass filter because the drift is slow and any large jumps in depth data are likely due to hands or objects temporarily crossing the line. The delta in slope and intercept for the top edge line is a measure of drift and roll. These deltas are applied to all pixels in the combined frame to compensate for the thermal related delta drift. In addition, this correction can be applied to a subset of the frame, such as a region, individual pixel, or every other pixel in order to reduce processing time.

Referring to FIG. 5, a rolling RANSAC sequence may be implemented in software, firmware and/or hardware. In software and firmware embodiments it may be implemented by computer executed instructions stored in one or more non-transitory computer readable media such as magnetic, semiconductor or optical storage.

Thus in FIG. 5, at block 30 the lens distortion is removed from the top edge line. Systematic distortion for each pixel is computed in the algorithm in FIG. 2 as indicated in block 26. This per-pixel systematic distortion is subtracted from each pixel in the top edge line. Then for each point on the line in diamond 32, points greater than a given distance (e.g. 5 millimeters) from the previous frame line are removed, as indicated in block 34. A threshold other than 5 millimeters may be used in other embodiments. Once this is completed for each point on the line, a linear RANSAC is performed (block 36) on the remaining points to get a line Z=mX+b where m is the slope and b is the intercept. Three-dimensional data for each pixel specified as 3 values, x, y, z, in millimeters. One ignores y, and fits a line through the pair of values x,z for all points across the top edge of the frame. These x, z are the values used to fit the line Z=mX+b.

Then in block 38 the difference in slope and intercept of the current frame line to the reference line is computed. Finally for each pixel in each frame, as implemented in diamond 40, drift and roll are corrected by subtracting the delta in slope*X+delta in intercept (block 42). Once this is done for each pixel in the frame, the flow ends.

By using the algorithm of FIG. 5 to calculate drift and roll, one is able to calibrate one time at start-up and then allow regular interaction of hands and objects on the table immediately. If live data is always referenced to the calibrated tabletop plane, it is possible to optimize the algorithm of FIG. 5 by adjusting the reference table plane by the delta in slope and intercept, which is a constant time operation, rather than adjusting all pixels in the final loop of the algorithm.

With the lens distortion removal and drift and roll correction, the tabletop depth data is forced to be both stationary and planar. With these combined algorithms, one is able to segment by thresholding relative to the table plane reliably.

These algorithms are applicable to all depth-sensing cameras that have dynamic warping that changes the infrared camera relative position, or that have remaining errors and biases after lens distortion correction. In some embodiments, these techniques may be implemented within the camera themselves.

The following clauses and/or examples pertain to further embodiments:

One example embodiment may be a method comprising correcting for curvature caused by thermal warping, depth data for a planar surface from a depth-sensing camera, and correcting the depth data for planar drift and rotation. The method may also include using the median distance of a plurality of frames depicting said planar surface to remove systematic error. The method may also include establishing said reference frame by averaging plane normals across said frames. The method may also include calibrating to find a horizontal reference line. The method may also include calibrating to find a horizontal reference line across a top edge of the planar surface. The method may also include filtering out points for a current frame that are more than a given distance from the reference line of a previous frame line. The method may also include computing a difference in slope and intercept of a current frame line to the reference line. The method may also include for each pixel, subtracting a delta in slope*X plus a delta in intercept. The method may also include capturing a plurality of snapshots with the cameras to factor out random noise. The method may also include removing depth data outliers below Q1−1.5*IQ or above Q3+1.5*IQR, where Q1 is first quartile, Q3 is a third quartile and IQR is inter-quartile range.

Another example embodiment may be one or more non-transitory computer readable media storing instructions to enable a hardware processor to perform a sequence comprising correcting for curvature caused by thermal warping, depth data for a planar surface from a depth-sensing camera, and correcting the depth data for planar drift and rotation. The media may perform said sequence including using the median distance of a plurality of frames depicting said planar surface to remove systematic error. The media may perform said sequence including establishing said reference frame by averaging plane normals across said frames. The media may perform said sequence including calibrating to find a horizontal reference line. The media may perform said sequence including calibrating to find a horizontal reference line across a top edge of the planar surface. The media may perform said sequence including filtering out points for a current frame that are more than a given distance from the reference line of a previous frame line. The media may perform said sequence including computing a difference in slope and intercept of a current frame line to the reference line. The media may perform said sequence including for each pixel, subtracting a delta in slope*X plus a delta in intercept. The media may perform said sequence including capturing a plurality of snapshots with the cameras to factor out random noise. The media may perform said sequence including removing depth data outliers below Q1−1.5*IQ or above Q3+1.5*IQR, where Q1 is first quartile, Q3 is a third quartile and IQR is inter-quartile range.

In another example embodiment may be an apparatus comprising a hardware processor to correct for curvature caused by thermal warping, depth data for a planar surface from a depth-sensing camera, and correct the depth data for planar drift and rotation, and a storage coupled to said processor. The apparatus may include said processor to use the median distance of a plurality of frames depicting said planar surface to remove systematic error. The apparatus may include said processor to establish said reference frame by averaging plane normals across said frames. The apparatus may include said processor to calibrate to find a horizontal reference line. The apparatus may include said processor to calibrate to find a horizontal reference line across a top edge of the planar surface. The apparatus may include said processor to filter out points for a current frame that are more than a given distance from the reference line of a previous frame line. The apparatus may include said processor to compute a difference in slope and intercept of a current frame line to the reference line. The apparatus may include said processor to subtract a delta in slope*X plus a delta in intercept. The apparatus may include said processor to capture a plurality of snapshots with the cameras to factor out random noise. The apparatus may include said apparatus includes a depth-sensing camera.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
    correcting, for curvature from lens distortion, depth data for a planar surface from a depth-sensing camera;
    correcting the depth data for planar drift and rotation from thermal warping;
    calibrating to find a horizontal reference line across a top edge of the planar surface; and
    filtering out points for a current frame that are more than a given distance from the reference line of a previous frame line.

2. The method of claim 1 including computing a difference in slope and intercept of a current frame line to the reference line.

3. The method of claim 2 including for each pixel, subtracting a delta in slope*X plus a delta in intercept.

4. The method of claim 1 including capturing a plurality of snapshots with the cameras to factor out random noise.

5. The method of claim 4 including removing depth data outliers below Q1−1.5*IQ or above Q3+1.5*IQR, where Q1 is first quartile, Q3 is a third quartile and IQR is inter-quartile range.

6. One or more non-transitory computer readable media storing instructions to enable a hardware processor to perform a sequence comprising:
    correcting, for curvature from lens distortion, depth data for a planar surface from a depth-sensing camera;
    correcting the depth data for planar drift and rotation from thermal warping;
    calibrating to find a horizontal reference line across a top edge of the planar surface;
    and filtering out points for a current frame that are more than a given distance from the reference line of a previous frame line.

7. The media of claim 6, said sequence including computing a difference in slope and intercept of a current frame line to the reference line.

8. The media of claim 7, said sequence including for each pixel, subtracting a delta in slope*X plus a delta in intercept.

9. The media of claim 6, said sequence including capturing a plurality of snapshots with the cameras to factor out random noise.

10. The media of claim 9, said sequence including removing depth data outliers below Q1−1.5*IQ or above Q3+1.5*IQR, where Q1 is first quartile, Q3 is a third quartile and IQR is inter-quartile range.

11. An apparatus comprising: a hardware processor to correct, for curvature caused by lens distortion, depth data for a planar surface from a depth-sensing camera, correct, for curvature from lens distortion, depth data for a planar surface from a depth-sensing camera; calibrate to find a horizontal reference line across a top edge of the planar surface, filter out points for a current frame that are more than a given distance from the reference line of a previous frame line; and a storage coupled to said processor.

12. The apparatus of claim 11, said processor to compute a difference in slope and intercept of a current frame line to the reference line.

13. The apparatus of claim 12, said processor to subtract a delta in slope*X plus a delta in intercept.

14. The apparatus of claim 11, said processor to capture a plurality of snapshots with the cameras to factor out random noise.

15. The apparatus of claim 11 wherein said apparatus includes a depth-sensing camera.

* * * * *